United States Patent Office 2,725,918
Patented Dec. 6, 1955

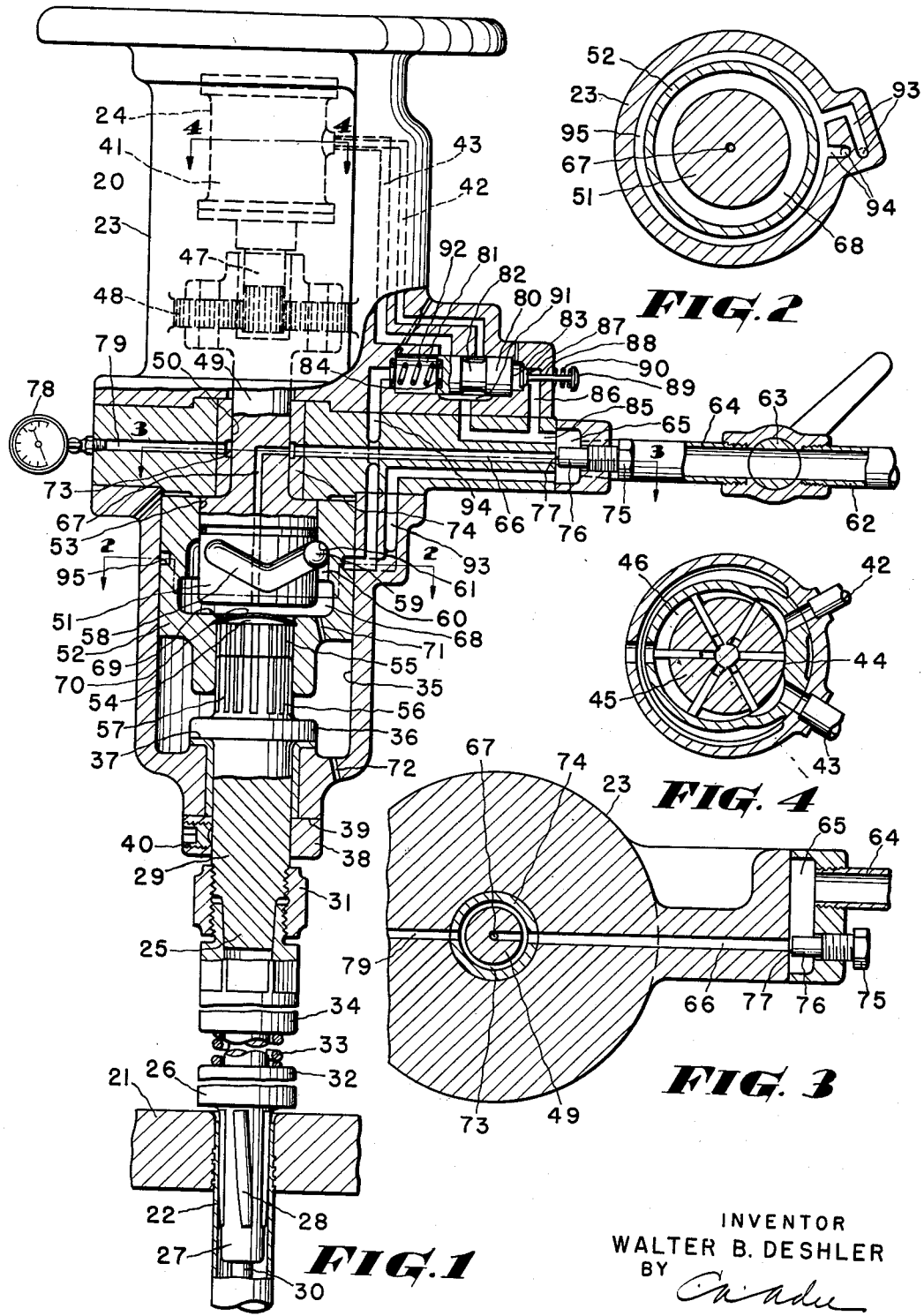

2,725,918

TUBE ROLLING DEVICE

Walter B. Deshler, Phillipsburg, N. J., assignor to Ingersoll-Rand Company, New York, N. Y., a corporation of New Jersey Application January 11, 1955, Serial No. 481,060

8 Claims. (Cl. 153—82)

This invention relates to tube rolling devices, and more particularly to a device of this type adapted to expand and seat the ends of tubes in tube sheets and the like.

One object of the invention is to assure uniform rolling of the tubes and tightness of the tube in the plate wherein it is seated.

Another object is to minimize the time required for rolling and expanding a tube within a tube sheet.

A more specific object is to effect the discontinuance of the rolling operation at the instant of completion of a correct joint between the tube and the member wherein it is seated.

Other objects will be in part obvious and in part pointed out hereinafter.

In the drawings accompanying this specification and in which similar reference numerals refer to similar parts, Figure 1 is a side elevation, partly broken away, of a tube rolling device constructed in accordance with the practice of the invention, and Figs. 2, 3 and 4 are transverse views taken through Figure 1 on the lines 2—2, 3—3 and 4—4, respectively.

Referring more particularly to the drawings, 20 designates the tube rolling device in its entirety, 21 a tube plate and 22 a tube having an end seated in the plate 21.

The tube rolling device 20 comprises a casing 23 having a motor 24 arranged in the rearward end thereof for driving a spindle 25 that actuates a rolling or expanding element 26 lying within the tube 22 for expanding it into fluid tight engagement with the tube plate 21. The expanding element 26 is shown as being of a well known type comprising a carrier 27 and rollers 28 therein for rolling engagement with the inner surface of the tube 22.

In the form illustrated, the spindle 25 consists of two parts 29 and 30 that are threaded at their opposed ends and secured together by a nut 31. The part 30 extends into the expanding element 26 and may, as is customary, be suitably tapered for engagement with the rollers 28. On the rearward end of the element 26 is a flange 32 which serves as a seat for an end of a compression spring 33 which tends to thrust the expanding element 26 forwardly along the part 30 for releasing the rollers 28 from frictional engagement with the tapered portion of the spindle part 30. The spring 33 encircles the spindle part 30 and seats at its opposite end against a shoulder 34 on the part 30.

The spindle part 29 is rotatable in the front end of the casing 23. Its rearward portion projects into an enlarged bore 35 in the casing and has an external flange 36 that engages a shoulder 37 on the casing to limit forward movement of the spindle with respect to the casing 23. Movement of the spindle assembly in the opposite direction is prevented by a removable collar 38 that encircles the part 29 and bears against the front end 39 of the casing 23. A set screw 40 in the collar 38 locks the collar to the part 29.

The motor 24 is shown as being of the fluid actuated sliding vane type, the housing 41 of which may be secured to the casing 23 in any suitable manner. The motor is reversible and accordingly has a pair of supply conduits 42 and 43 which are located on opposite sides of the area 44 of minimum clearance between the rotor 45 and the wall of the chamber 46 containing the rotor. Rotary movement is transmitted from the shaft 47 of the motor 24, through suitable planetary gearing 48, to a shaft 49 having a bearing 50 in the casing 23 and extending into the bore 35. The portion 51 of the shaft 49 lying within the bore 35 is somewhat enlarged and is in slidable engagement with a member 52 that serves to transmit movement from the shaft 49 to the spindle. The member 52 has a bore 53 for slidable engagement with the portion 51, and in the front end of the member 52 is an aperture 54 having a series of ribs 55 extending longitudinally thereof to interlock slidably with similar ribs 56 on the periphery of a stem 57 on the flange 36.

Means are also provided for effecting a driving connection between the shaft 49 and the member 52. To this end the portion 51 of the shaft 49 is provided in its periphery with V-shaped grooves 58, two for example, of semi-circular cross section for the accommodation of balls 59 that lie partly within recesses 60 in the surface of the bore 53. The arrangement of the grooves 58, recesses 60 and balls 59 is similar to that illustrated in U. S. Patent No. 2,160,150, Jimerson et al.

As explained in the aforesaid patent the recesses 60, more particularly the bottoms 61 thereof, are also of V-shape and inverted with respect to the grooves 58. Thus, when the shaft 49 rotates with respect to the member 52 the balls 59 tend to move toward one of the ends of each of the grooves 58 and recesses 60 move the member 52 in one direction (to the rear as shown in Fig. 1) axially of the shaft 49 and the spindle. It is noted that if a tool capable of rolling in one direction only is required, then only one half of each V of the grooves 58 and recesses 60 need be supplied—e. g. that portion of the grooves extending from the apices to the right of the passage 67 in Fig. 1.

The pressure fluid serving to drive the motor is conveyed from a source of supply (not shown) by a conduit 62 attached to the casing 23 and having interposed therein a manually operable cut-off valve 63. The portion 64 of the conduit extending from the valve 63 to the casing is preferably rigid to serve as a handle for guiding the tube rolling device with respect to the work. The conduit 62 opens into a chamber 65 in the casing 23 which also has a passage 66 for conveying pressure fluid to a passage 67 in the shaft 49. The passage 67 extends through the forward portion of the shaft 49 and opens into a chamber 68 in the member 52. The bottom or end wall of the chamber 68 constitutes a pressure surface 69 against which such pressure fluid acts for moving the member 52 to its foremost position in the bore 35 with the balls 59 at the apices of the grooves 58 and recesses 60.

A dished plate 70 is inserted in the rearward end of the aperture 54 to preclude leakage of fluid from the chamber 68 along the ribs 55—56. A bleed-off port 71 in the member 52 is provided for the escape of pressure fluid from the chamber 68 to the bore 35 and thence to the atmosphere through port 72 in casing 23. Thus the force urging the member 52 forwardly may be varied by merely varying the pressure of fluid supplied to the chamber 68.

Communication between the passages 66 and 67 is afforded by an annular groove 73 in a bearing 74 for the shaft 49 and the pressure value of the fluid in the chamber 68 for action against the surface 69 is controlled by a screw 75 threaded into the casing and having a stem 76 extending through the chamber 65 and overlying at its inner end 77 the entrance end of the passage 66. Being threadedly engaged with the casing the screw 75 may be adjusted as required to vary the flow area across the end 77 for varying the pressure within the chamber 68. The value of such pressure fluid within the chamber 68 is indicated by a gage 73 which is threadedly connected to the casing 23 and in constant communication with the groove 73 to a passage 79.

The means serving to control the flow of pressure fluid to and in the direction of rotation of the rotor 45 comprises a valve 80 reciprocable in a chamber 81 in the casing 23. The valve has an intermediate portion 82 of reduced diameter around which pressure fluid flows to the motor and its opposed ends constitute actuating surfaces 83 and 84 against which pressure fluid acts for moving the valve from one controlling position to the other.

Pressure fluid is conveyed to the intermediate portion of the valve chamber 81 by a passage 85 that has a branch passage 86 leading to an end of the valve chamber for supplying pressure fluid to the actuating surface 83. Communication between the branch 86 and the valve chamber 81 is controlled by a manual operable valve 87 of the poppet type the stem 88 of which projects from the casing 23 and carries a button 89 against which manual pressure may be applied for unseating the valve. A spring 90 encircling the stem 88 seats against the casing and the button 89 for normally maintaining the valve 87 on its seat.

The passage 85 opens into a groove 91 extending longitudinally of the intermediate portion of the valve chamber 81 and of such length that in one limiting position (see Fig. 1) of the valve 87 both ends of the groove 91 are covered by said valve. In the other, or second, position of the valve the end of the groove 91 adjacent the valve surface 83 is uncovered to supply pressure fluid directly from the passage 85 to the actuating surface 83 for holding the valve in the second limiting position against the force of a spring 92 to supply pressure fluid to the motor 24 through the conduit 43 for rotating the motor in one direction.

The valve 80 is normally held in its first limiting position for establishing communication between the passage 85 and the conduit 42 by the spring 92 seating against the end of the valve chamber 81 and the actuating surface 84 of the valve. Movement of the valve 80 into the first limiting position to reverse the rotation of the rotor 45 is controlled by movement of the member 52 in response to a predetermined torque load on the motor. To this end the casing is provided with a passage 93 leading from the chamber 65 to the bore 35. A passage 94 opening into the bore 35 in the same transverse plane as the passage 93, leads to the inner end of the valve chamber 81. Communication between the passages 93 and 94 is established through an annular groove 95 in the periphery of the member 52 whenever the member 52 is near one limiting position, see Fig. 1, thereby supplying pressure fluid to the chamber 81 to throw the valve 80.

In the operation of the device, the operator opens the valve 63 supplying pressure fluid to the motor 24 through the conduit 42 (the position of the valve 80 is that shown in Fig. 1) for rotating the driving spindle 25 in, for example, the left hand direction. At the same time, pressure fluid is supplied through the passage 66 to the chamber 68 so that the member 52 is urged into its forward limiting position by the force of pressure fluid acting on the surface 69. In this position of the member 52, the groove 95 does not register with the passage 94 so that communication is cut off between the passages 93 and 94.

It is to be noted that the diameter of the conduit 42, shown by way of example, is relatively small, as compared to conduit 43, so that the motor runs relatively slow in the left hand direction. The reason for this is that in the event a swivel type connection (not shown) is used between the spindle 25 and the expanding element 26, at this slow motor speed the element will not swing out on the swivel thus making it relatively easy to insert the element into the tube. If a tool capable of rolling in either direction is required the conduits 42 and 43 should be of equal size with a connection valve therein to control the speed of the motor rotation in the non-rolling direction.

Once the element 26 is properly positioned in the tube 22, the operator depresses the valve 87 admitting pressure fluid to the valve surface 83 throwing the valve 80 into its other limiting position cutting off the supply of pressure fluid to the conduit 42 and admitting pressure fluid to the conduit 43 to reverse the direction of rotation of the motor. Rotation of the element 26 in the right hand direction causes the rollers 28, which are biased at an angle to the axis of carrier 27 for self-feeding in any conventional manner, to pull the element 26 into the tube and the tapered spindle part into said carrier 27, thereby expanding the tube tightly in the tube plate 21.

This action increases the torque, or twisting force, required to rotate the spindle 25 until it reaches a value whereat the camming force between the ball 59 and member 52 is sufficient to overcome the oppositely directed force exerted on the member 52 by pressure fluid acting on the surface 69. At this torque level the member 52 will be cammed rearwardly, the balls 59 will roll along one of the grooves 58 and recesses 60 away from the apices, until the groove 95 registers with the passages 93 and 94. Pressure fluid will then flow into the inner end of the valve chamber 81 to throw the valve 80 into its first limiting position to reverse the rotation of the motor 24. The position of the various elements of the device at this instant are those shown in Fig. 1. Once the torque is reduced on the spindle 25, the force of pressure fluid acting on the surface 69 will move the member 52 forwardly until the balls are again positioned in the apices of the grooves 58 and recesses 60. This action, then, returns all parts to the position described at the start of the rolling operation.

Thus the tool automatically stops rolling the tube at a predetermined torque, and simultaneously reverses its rotation so that it may be removed from the tube and is ready to be inserted in the next tube to be rolled. It is to be noted that the torque, or twisting force, at which the rolling operation is halted may be varied over a wide range by merely varying the pressure of fluid acting on the surface 69 by changing the position of the stem 76 relative to the mouth of the passage 66.

I claim:

1. A tube rolling device, comprising a casing, a spindle rotatable in the casing, a tube-expanding element on the spindle, a fluid-actuated reversible motor for rotating the spindle, means for selectively causing the motor to rotate in one direction, and means acting responsively to a predetermined torque of the motor for causing the motor to rotate in the opposite direction.

2. A tube rolling device, comprising a casing, a spindle rotatable in the casing, a tube-expanding element on the spindle, a fluid-actuated reversible motor and shaft for rotating the spindle, a valve for controlling the supply of pressure fluid to the motor and being shiftable to different positions for controlling the direction of rotation of the motor, manually operable means for effecting movement of the valve to one controlling position, and means for transmitting movement from the shaft to the spindle acting responsively to a predetermined torque of the shaft for effecting movement of the valve to another controlling position.

3. A tube rolling device, comprising a casing, a spindle rotatable in the casing, a tube-expanding element on the spindle, a fluid-actuated reversible motor for rotating the spindle having a shaft, a valve shiftable to different positions for controlling the flow of pressure fluid to the motor, opposed actuating surfaces on the valve and one of which is selectively subjected to pressure fluid for shifting the valve to one controlling position to cause the motor to rotate in one direction, a member for transmitting movement from the shaft to the spindle and being movable axially thereof, a pressure surface on the member constantly subjected to pressure fluid for holding said member in one limiting position, means for selectively varying the pressure value of the fluid acting against the pressure surface, means acting responsively to a predetermined torque of the motor for moving the member to another limiting position, and means on the member for valving pressure fluid to the other actuating surface for shifting the valve to another controlling position.

4. A tube rolling device, comprising a casing, a spindle rotatable in the casing, a tube-expanding element on the spindle, a fluid-actuated reversible motor for rotating the spindle having a shaft, a valve shiftable to different positions for controlling the flow of pressure fluid to the motor, opposed actuating surfaces on the valve, means for normally holding the valve in one controlling position to cause rotation of the motor in one direction, manually operable means for supplying pressure fluid to one actuating surface to shift the valve to another position for causing rotation of the motor in the opposite direction, a member for transmitting rotary movement from the shaft to the spindle and being movable axially thereof, a pressure surface on the member constantly subjected to pressure fluid for holding the member in one limiting position, means acting responsively to a predetermined torque of the shaft for moving the member to another limiting position, and means on the member for valving pressure fluid to the other actuating surface for returning the valve to said one position.

5. A tube rolling device, comprising a casing, a spindle rotatable in the casing, a tube-expanding element on the spindle, a fluid-actuated reversible motor for driving the spindle having a shaft, a valve for controlling the flow of pressure fluid to the motor having a pair of opposed actuating surfaces one of which is selectively subjected to pressure fluid for throwing the valve to cause the motor to rotate in one direction, and means interlockingly connected with the shaft and the spindle and movable axially thereof to valve pressure fluid to the other actuating surface for shifting the valve to supply pressure fluid to the motor for rotation in the opposite direction.

6. A tube rolling device, comprising a casing, a spindle rotatable in the casing, a tube-expanding element on the spindle, a fluid-actuated reversible motor for driving the spindle having a shaft, a fluid actuated valve for controlling the flow of pressure fluid to the motor having a pair of opposed actuating surfaces one of which is subjected selectively to pressure fluid for throwing the valve to cause the motor to rotate in one direction, a member for transmitting movement from the shaft to the spindle movable axially of both and having means for valving pressure fluid to the other actuating surface for shifting the valve to supply pressure fluid to the motor for rotation in the opposite direction.

7. A tube rolling device, comprising a casing, a spindle rotatable in the casing, a tube-expanding element on the spindle, a fluid-actuated reversible motor for rotating the spindle having a shaft, a fluid actuated valve for controlling the flow of pressure fluid to the motor having a pair of opposed actuating surfaces one of which is selectively subjected to pressure fluid for shifting the valve to one controlling position, a member for transmitting movement from the shaft to the spindle movable axially thereof and having means for valving pressure fluid to the other actuating surface for throwing the valve to another controlling position, and a spring for normally holding the valve in the said other controlling position.

8. A tube rolling device, comprising a casing, a spindle rotatable in the casing, a tube-expanding element on the spindle, a fluid-actuated reversible motor for driving the spindle and having a drive shaft, a member for transmitting rotary movement from the drive shaft to the spindle and movable axially with respect to both, a pressure surface on the member subjected to pressure fluid for actuating the said member in one direction axially of the drive shaft, means for supplying pressure fluid to the actuating surface, a valve for controlling the flow of pressure fluid to the motor having opposed actuating surfaces one of which is selectively subjected to pressure fluid for throwing the valve to a position for valving pressure fluid to the motor for driving the spindle in one direction, means interlockingly engaging the member and the drive shaft and acting to move the member in the opposite direction with respect to the drive shaft and the spindle whenever the resistance of the tube-expansion element exceeds the pressure acting against the pressure surface, and passages controlled by the first said means for valving pressure fluid to another actuating surface for throwing the valve to a position for valving pressure fluid to the motor for rotation in the opposite direction.

References Cited in the file of this patent

UNITED STATES PATENTS

| | | |
|---|---|---|
| 2,079,640 | Vickers | May 11, 1937 |
| 2,160,150 | Jimerson | May 30, 1939 |
| 2,306,436 | Grinninger | Dec. 29, 1942 |
| 2,355,852 | Fisher | Aug. 15, 1944 |
| 2,389,098 | Welch | Nov. 13, 1945 |
| 2,476,632 | Shaff | July 19, 1949 |
| 2,499,708 | Whitledge | Mar. 7, 1950 |
| 2,535,782 | Carlson | Dec. 26, 1950 |
| 2,539,123 | Dudley | Jan. 23, 1951 |
| 2,552,840 | Burke | May 15, 1951 |
| 2,690,205 | Stary | Sept. 28, 1954 |
| 2,698,517 | Witt | Jan. 4, 1955 |
| 2,715,889 | Sturrock | Aug. 23, 1955 |

FOREIGN PATENTS

| | | |
|---|---|---|
| 618,702 | Great Britain | Feb. 25, 1949 |
| 471,161 | Canada | Jan. 10, 1951 |